(12) United States Patent
Maschek, Jr. et al.

(10) Patent No.: US 8,191,620 B2
(45) Date of Patent: Jun. 5, 2012

(54) GRIPPER FOR COILED TUBING INJECTORS (75) Inventors: Johnnie B. Maschek, Jr., Grand Prairie, TX (US); Carl Stephen Lammons, Burleson, TX (US)

(73) Assignee: Serva Group LLC, Oklahoma City, OK (US)

( * ) Notice: Subject to any disclaimer, the term of this patent is extended or adjusted under 35 U.S.C. 154(b) by 206 days.

(21) Appl. No.: 12/550,067

(22) Filed: Aug. 28, 2009

(65) Prior Publication Data
US 2011/0048694 A1 Mar. 3, 2011

(51) Int. Cl.
*E21B 19/08* (2006.01)
*E21B 19/22* (2006.01)

(52) U.S. Cl. .................... 166/77.3; 226/172
(58) Field of Classification Search .............. 166/77.3, 166/77.2, 384, 385; 226/171–173
See application file for complete search history.

(56) References Cited

U.S. PATENT DOCUMENTS

| 3,369,465 | A | * | 2/1968 | Harrah | 92/218 |
| 3,754,474 | A | | 8/1973 | Palynchuk | |
| 3,945,547 | A | | 3/1976 | Ledebur | |
| 5,309,990 | A | | 5/1994 | Lance | |
| 6,173,769 | B1 | | 1/2001 | Goode | |
| 6,189,609 | B1 | | 2/2001 | Shaaban | |
| 6,216,780 | B1 | | 4/2001 | Goode et al. | |
| 6,302,617 | B1 | * | 10/2001 | Rumpp | 403/348 |
| 6,425,441 | B2 | | 7/2002 | Shaaban et al. | |
| 6,595,825 | B1 | * | 7/2003 | De Wilde | 446/102 |
| 6,715,721 | B2 | * | 4/2004 | Buck | 248/74.2 |
| 6,880,629 | B2 | | 4/2005 | Schroeder | |
| 6,892,810 | B2 | | 5/2005 | Austbo et al. | |

FOREIGN PATENT DOCUMENTS
EP 0524648 1/1993
GB 2326178 12/1998

* cited by examiner

*Primary Examiner* — David Andrews
(74) *Attorney, Agent, or Firm* — McAfee & Taft (57) ABSTRACT

The current device relates to a gripper assembly for use within a coiled tubing injector unit. The gripper assembly comprises a carrier for securing the gripper to the chain drive mechanism of the coiled tubing injector unit and a gripping shoe carried by the carrier. The configuration of the gripper assembly permits quick and easy removal and replacement of the gripping shoe.

25 Claims, 12 Drawing Sheets

GRIPPER FOR COILED TUBING INJECTORS

BACKGROUND OF THE INVENTION

Figure 1:
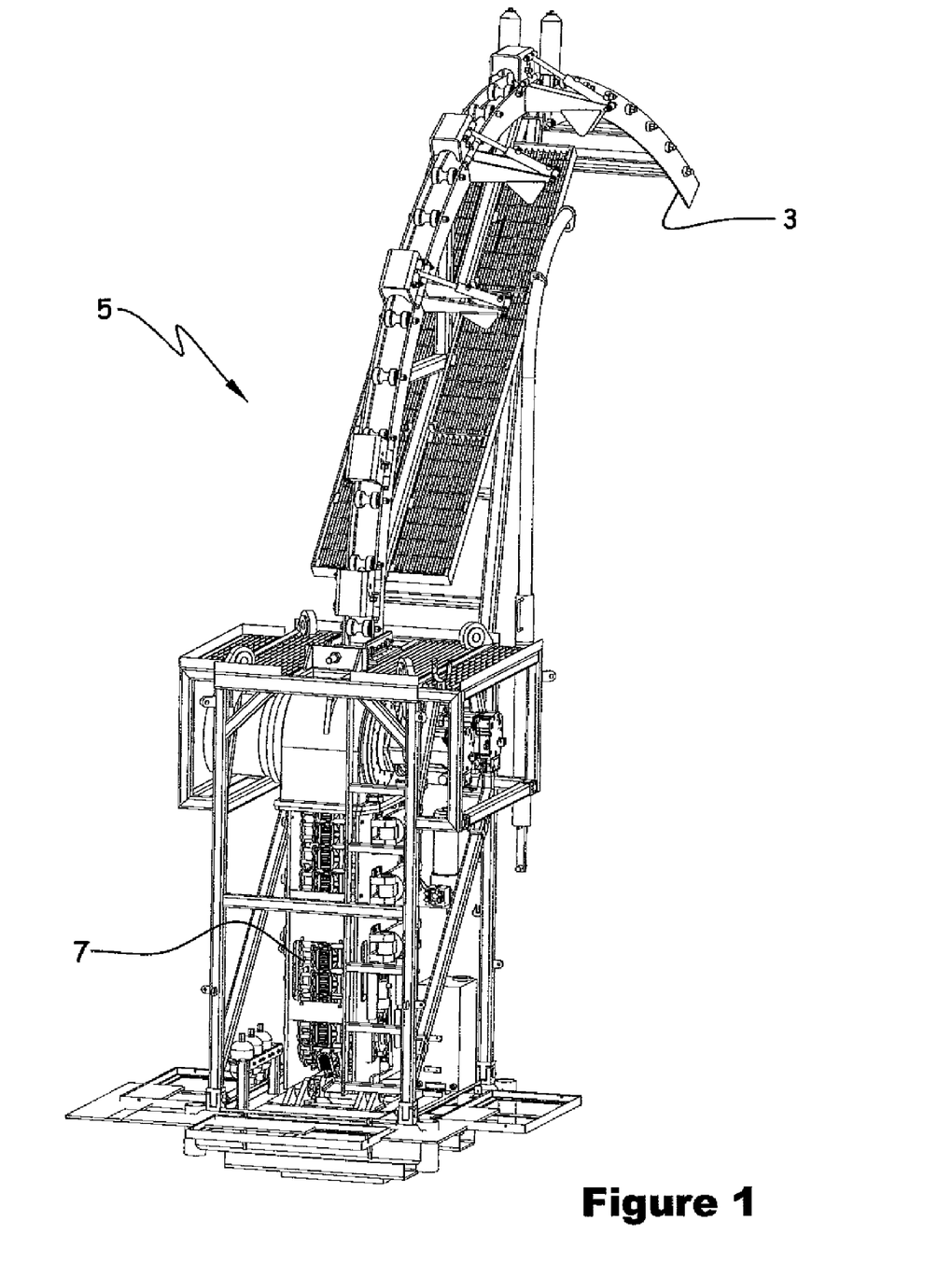
FIG. 1 is a perspective view of a coiled tubing injector unit.

First introduced to oilfield operations in the early 1960's, coiled tubing is now an essential component of hydrocarbon production. Coiled tubing is used in applications ranging from well cleanout to directional drilling. Available in sizes ranging from 1" to 4.5", coiled tubing strings are carried on reels and injected into a wellbore using a coiled tubing injector unit. A typical coiled tubing injector unit 5 is depicted in FIG. 1. The typical unit includes a goose-neck support 3, a rotary transmission assembly, parallel drive-chains 7 carrying grippers, skates and a hydraulic system. (The transmission assembly, grippers, skates and hydraulic system are not shown in detail in FIG. 1.) Those skilled in the art are familiar with the components and operation of the unit 5 depicted in FIG. 1.

The series of grippers carried by the chains provide the sole direct support for holding the coiled tubing in place or moving the tubing. The grippers are arranged in opposing pairs to secure the coiled tubing string between the injector-head chains. The hydraulic system applies pressure to the skates which in turn force the grippers toward each other thereby securing the coiled tubing between the grippers. Additionally, the hydraulic drive system drives the chains to feed the coiled tubing string into the well or pull the tubing out of the well.

A typical gripper includes a carrier secured to the chain and a gripping shoe supported by the carrier. From time to time, the gripping shoe must be replaced due to damage or to accommodate a change in tubing diameter or insertion of a downhole tool. Therefore, a need exists for a carrier/gripping shoe assembly which permits replacement of the gripping shoe without replacing the entire chain assembly.

SUMMARY OF THE INVENTION

The current invention provides a gripper assembly suitable gripping and transporting coiled tubing. The gripper assembly comprises a carrier having an upper surface with at least one arcuate channel. Positioned on the carrier is a gripping shoe. The gripping shoe has at least one downwardly extending leg carrying an inwardly projecting tab. The leg and inwardly projecting tab cooperates with the carrier to preclude lateral movement of the gripping shoe while permitting rotational movement of the gripping shoe on the carrier. In the assembled position, the tab cooperates with the carrier to retain the gripping shoe on the carrier.

In another embodiment, the current invention provides a gripper assembly for use in a coiled tubing injector unit. The carrier has an upper surface with at least two arcuate channels. Positioned on the carrier is a gripping shoe having two downwardly extending legs. Each leg carries an inwardly projecting tab. The legs and inwardly projecting tabs cooperate with the carrier to preclude lateral movement of the gripping shoe while permitting rotational movement of the gripping shoe on the carrier. In the assembled position, the tabs cooperate with the carrier to retain the gripping shoe on the carrier.

Still further, the current invention provides another embodiment of a coiled tubing gripper assembly. The gripper assembly comprises a carrier having an upper surface and at least two outwardly extending lips. The upper surface has a circular channel. Positioned on the carrier is a gripping shoe. The gripping shoe has two downwardly extending legs, each leg carrying an inwardly projecting tab. The inwardly projecting tabs cooperate with the carrier and the outwardly extending lips to preclude lateral and vertical movement of the gripping shoe while permitting rotational movement of the gripping shoe on the carrier. In the assembled position, the tabs cooperate with the outwardly extending lips to retain the gripping shoe on the carrier.

In yet another embodiment, the present invention provides a gripper assembly suitable for supporting coiled tubing. The gripper assembly comprises a carrier having an upper surface, a first side and a second side. The first side carries an outwardly extending lip and the second side carries an outwardly extending lip. The upper surface has two recessed arcuate channels, wherein each recessed arcuate channel has a first open end terminating at the first side of the carrier and a second open end terminating at the second side of the carrier. The gripper assembly further comprises a gripping shoe positioned on the carrier. The gripping shoe has two downwardly extending legs, each leg carrying an inwardly projecting tab. The inwardly projecting tabs cooperate with the outwardly extending lips to retain the gripping shoe on the carrier. Preferably, the inwardly projecting tabs cooperate with the carrier and the outwardly extending lips to preclude lateral and vertical movement of the gripping shoe following assembly while permitting rotational movement of the gripping shoe on the carrier during assembly.

DETAILED DISCLOSURE OF THE CURRENT INVENTION

Figures 2, 3:
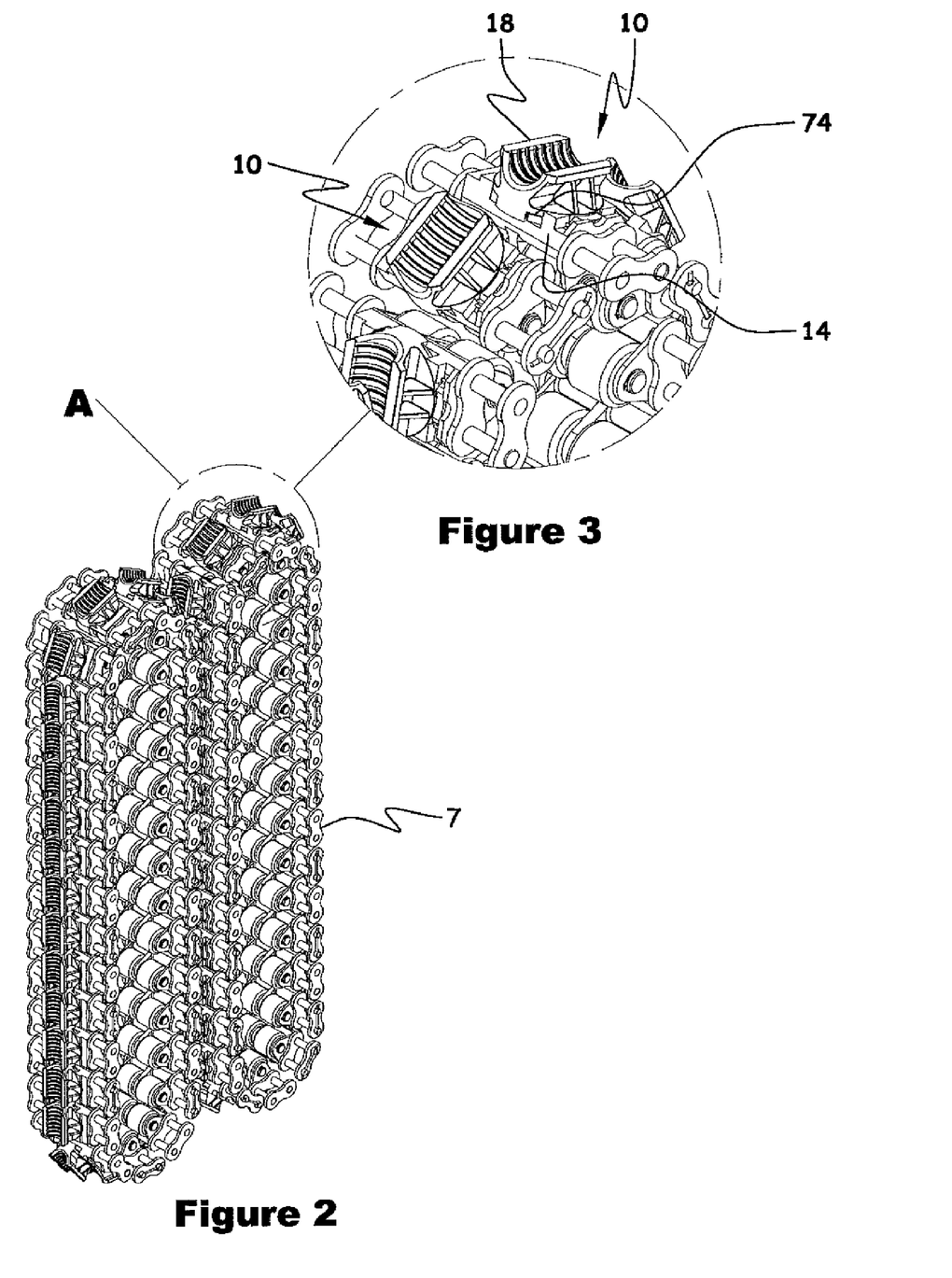
FIG. 2 depicts the drive chain assembly component of FIG. 1.
FIG. 3 is a close up view corresponding to circle A of FIG. 2 and depicting the improved gripper on the chain assembly.
Figure 4:
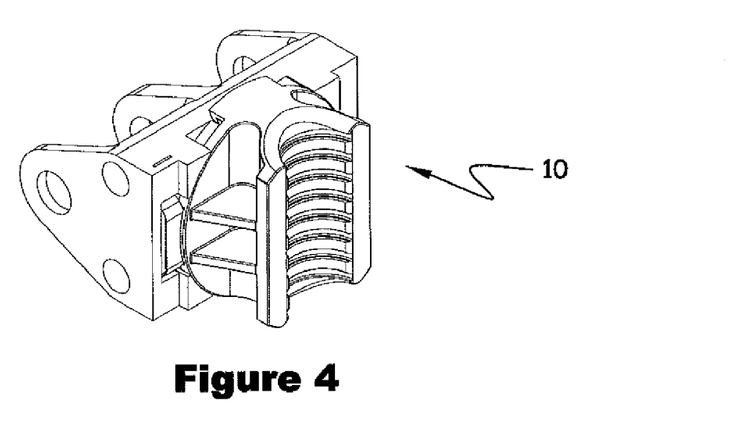
FIG. 4 is a perspective view of one embodiment of the gripper.
Figure 5:
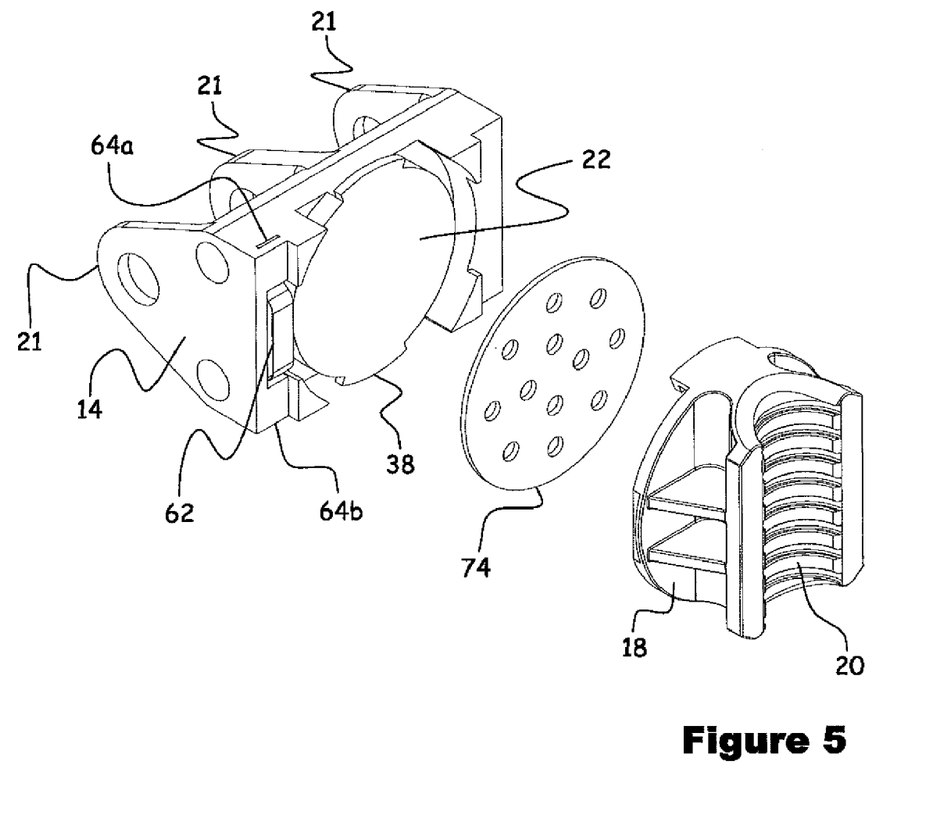
FIG. 5 is an expanded view of FIG. 4 depicting the primary components of the gripper.

The current invention provides an improved gripper 10, also referred to as a gripper assembly, suitable for use in a conventional coiled tubing injector unit 5 to grasp and hold coiled tubing. As depicted in FIG. 2, the improved gripper 10 is attached to a conventional drive chain 7. With reference to FIGS. 4 and 5, improved gripper 10 includes a carrier 14, a gripping shoe 18 and a pad 74.

Figure 6:
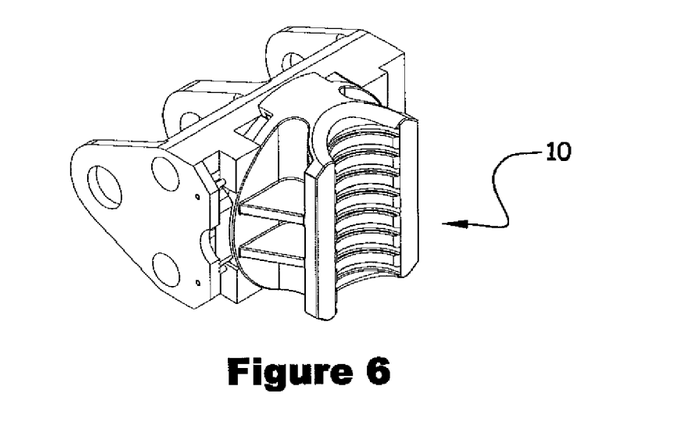
FIG. 6 is perspective view of the preferred embodiment of the gripper.
Figure 7:
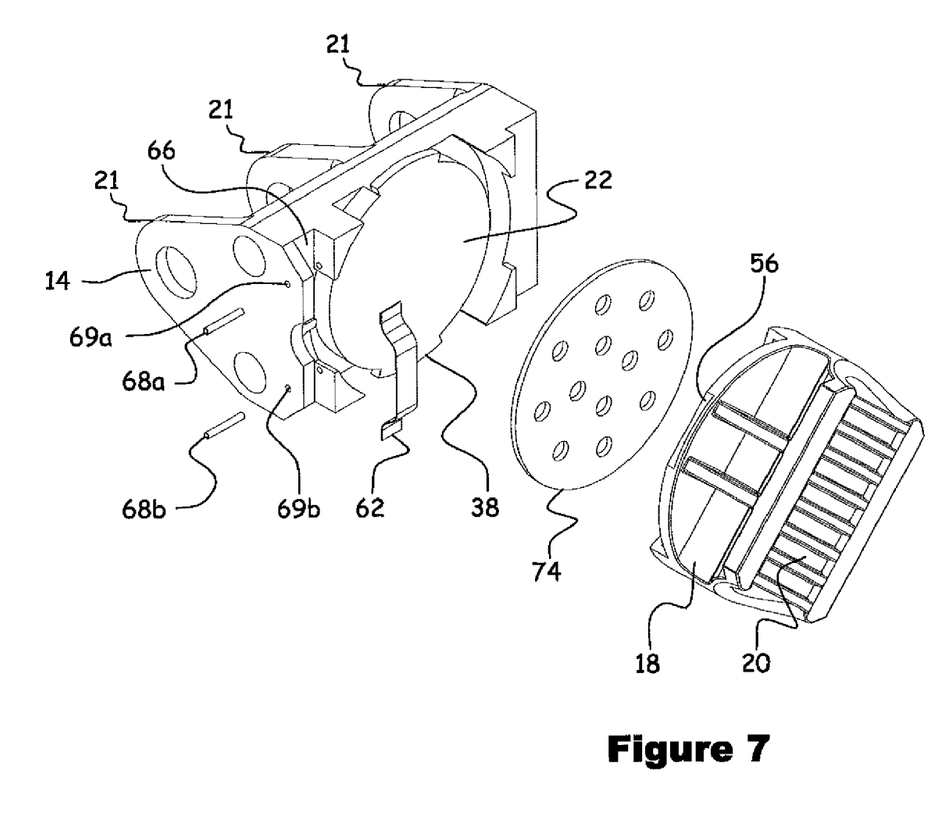
FIG. 7 is an expanded view of the preferred embodiment depicted in FIG. 6.
Figure 11:
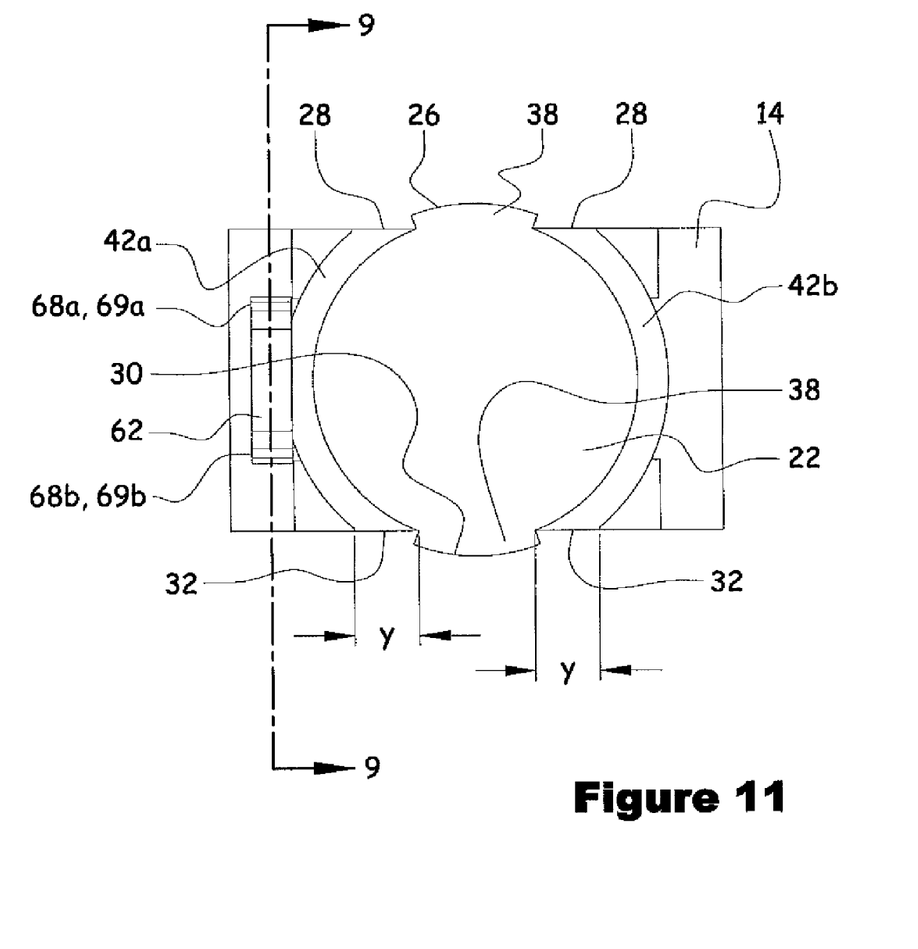
FIG. 11 is a top view of the preferred embodiment of the carrier.

The primary components of the preferred carrier 14 are best seen in FIGS. 6-7 and 11. As depicted therein, carrier 14 has a lower surface 21 suitable for securing carrier 14 to drive chain 7. The configuration of lower surface 21 is not critical to the current invention. Rather, lower surface 21 may be any configuration suitable for joining carrier 14 to drive chain 7 as known to those skilled in the art. Further, the manner of attaching carrier 14 to drive chain 7 is well known to those skilled in the art. The upper surface 22 of carrier 14 includes first and second sides 26, 30. Each side 26, 30, carries an outwardly extending lip 38. Preferably, lips 38 are 180 degrees apart, i.e. directly across from one another. In the preferred embodiment depicted by FIG. 11, upper surface 22 has two recessed arcuate channels 42; 42b, each channel having a first open end 28 terminating at first side 26 and a second open end 32 terminating at second side 30. In the currently preferred embodiment, a defined distance, Y, exists between each open end 28 and 32 and outwardly extending lips 38. Lips 38 may extend outward from upper surface 22 or may be offset from upper surface such that lips 38 are not flush with upper surface 22. Upper surface 22 also carries a retaining clip 62.

In FIGS. 4-5, retaining clip 62 fits within a pair of slots 64; 64b. In FIGS. 6-7, the preferred embodiment, retaining clip 62 is located in a channel 66 and secured to carrier 14 by a pair of pins 68a, 68b positioned within holes 69; 69b. The manner of securing retaining clip 62 to carrier 14 is not critical provided that retaining clip 62 maintains gripping shoe 18 in the desired position as shown in FIGS. 4 and 6. In the alternative embodiment of FIG. 8, retaining clip 62 includes a tab 62a. Tab 62a cooperates with a corresponding recess or slot 62c in gripping shoe 18 to retain gripping shoe 18 in the desired position on carrier 14. In the embodiments of FIGS. 5 and 7, retaining clip 62 lacks tab 62a. In this embodiment, retaining clip 62 either blocks rotational movement of gripping shoe 18 or provides sufficient frictional contact to maintain gripping shoe 18 in the desired position on carrier 14.

Figure 10:
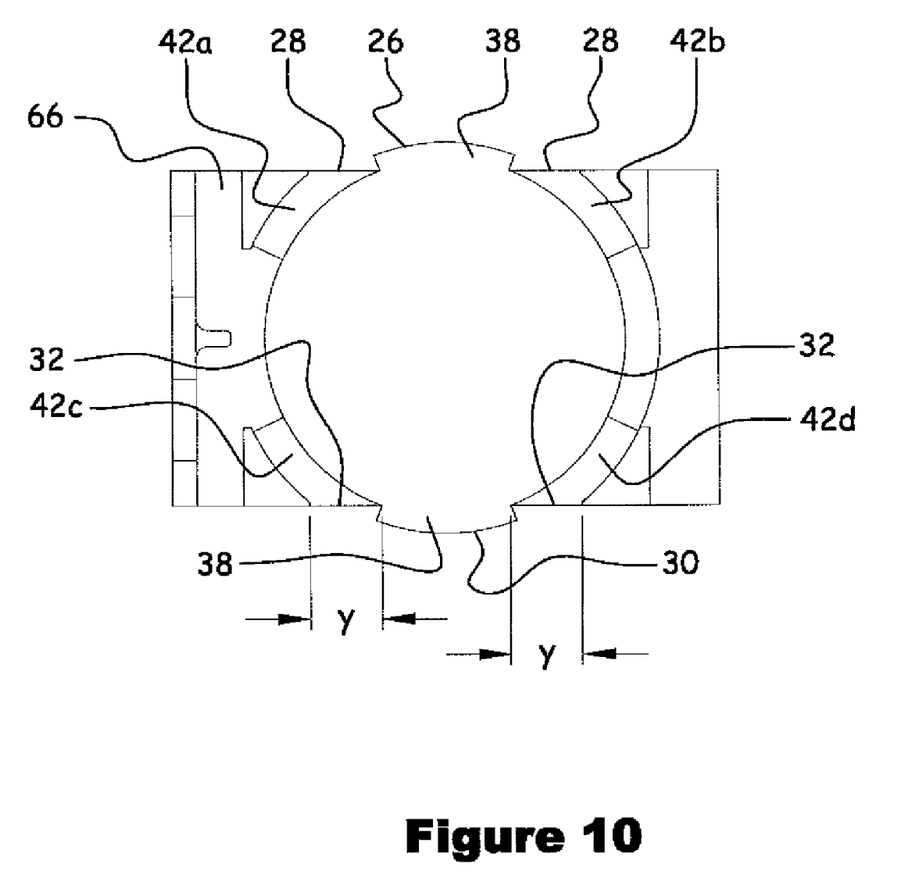
FIG. 10 is a top view of one embodiment of the carrier.

An alternative embodiment of carrier 14 is depicted in FIG. 10. In this embodiment, arcuate channels 42a and 42b do not extend from first side 26 to second side 30. Rather, additional channels 42c and 42d provide suitable channels for receiving gripping shoe 18. Regardless of the use of two arcuate channels or four arcuate channels, each channel will have at least one opening adjacent to extending lips 38. For the purposes of this disclosure, the term adjacent refers to that distance defined as Y or less.

Gripping shoe 18 has a concave upper surface 20 configured to grip coiled tubing. In the assembled configuration, the concave upper surface 20 defines the central axis, W, of gripper assembly 10. Thus, as depicted by FIGS. 3-4 and 6, when gripping shoe 18 is in the assembled position on carrier 14, outwardly extending lips 38 of carrier 14 correspond to the defined central axis W. Accordingly, in the assembled configuration, central axis W corresponds to the plane defined by parallel drive chains 7. Additionally, central axis W corresponds to the position of coiled tubing (not shown) held in place by opposing grippers 10 carried by parallel drive trains 7.

Figure 12:
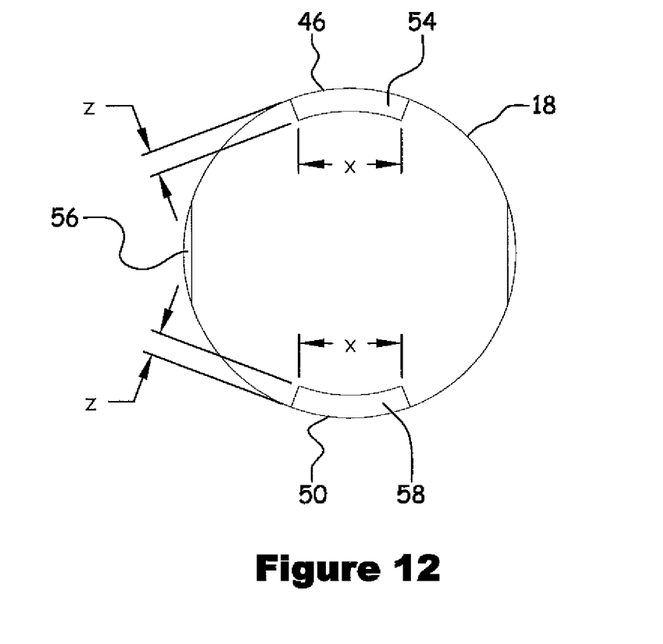
FIG. 12 is a bottom view of the preferred embodiment of the gripping shoe.
Figure 13:
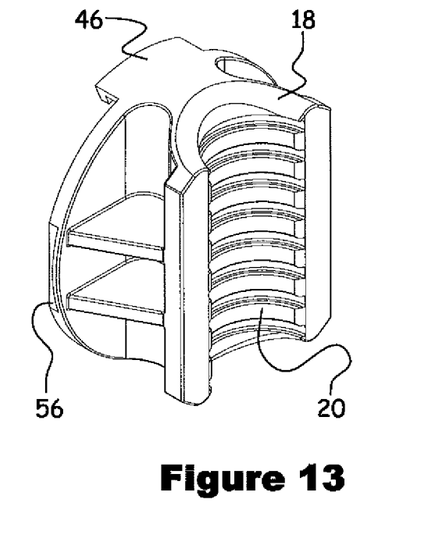
FIG. 13 is a top perspective view of the preferred embodiment of the gripping shoe.
Figure 14:
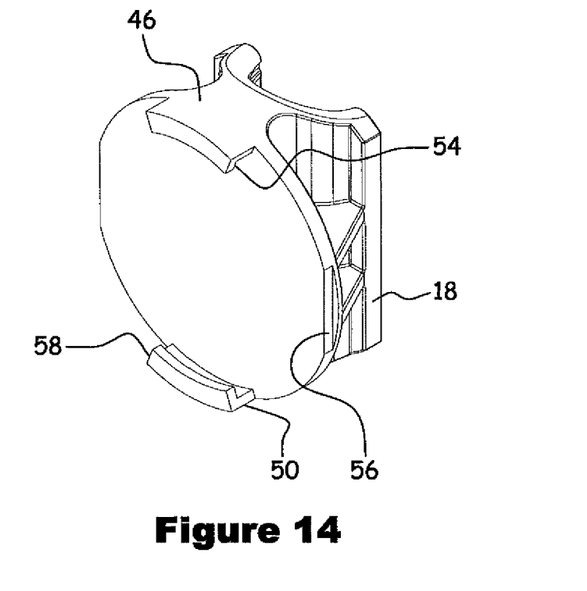
FIG. 14 is a bottom perspective view of the preferred embodiment of the gripping shoe.
Figure 15:
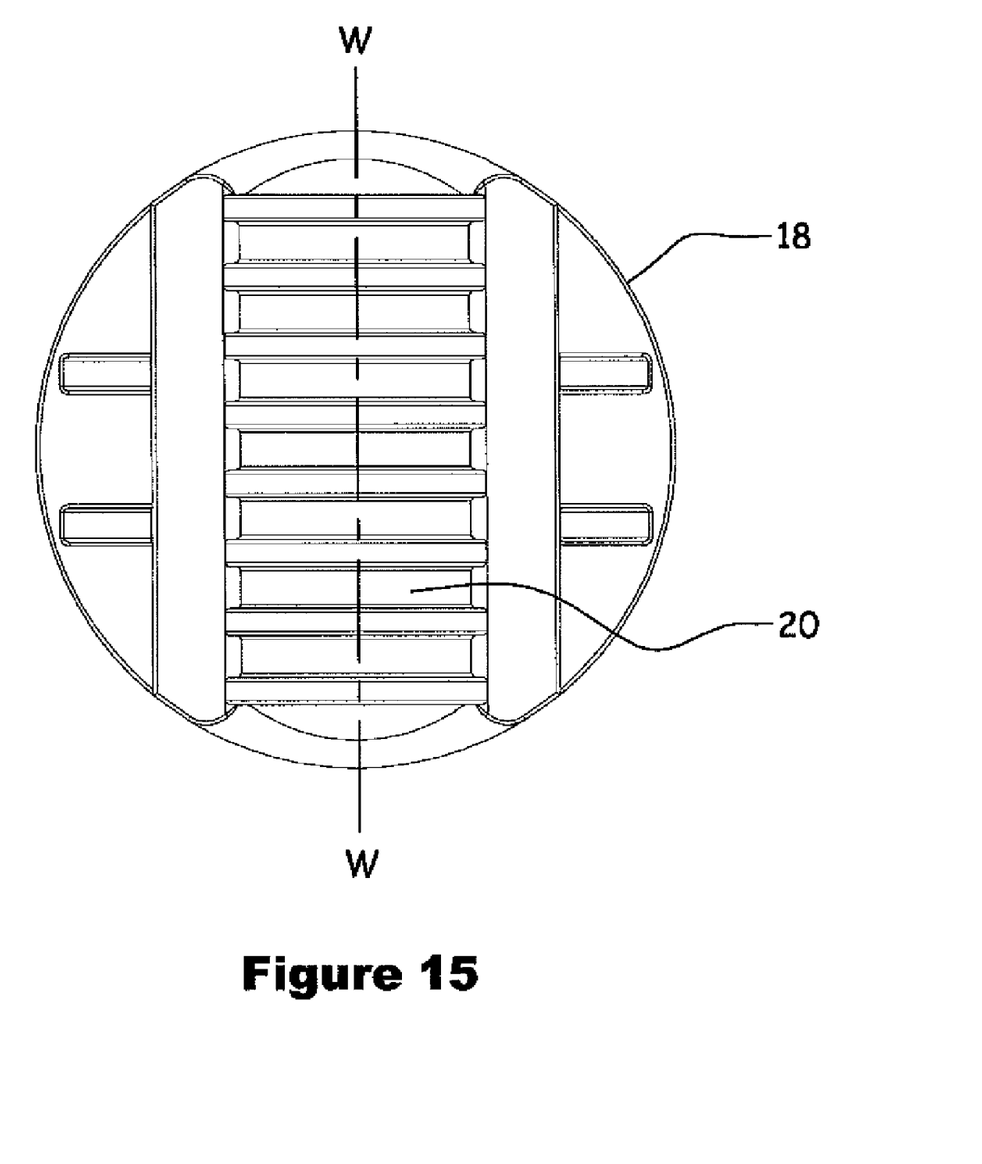
FIG. 15 is a top view of the gripping shoe.

The primary components of gripping shoe 18 are best seen in FIGS. 12-14. As depict therein, gripping shoe 18 includes at least two downwardly extending legs 46, 50. Each leg carries an inwardly projecting tab 54, 58. In the preferred embodiment, tabs 54 and 58 have a length, X, which is greater than the defined distance Y. Thus, in the preferred embodiment, as tabs 54, 58 exit arcuate channels 42a, 42b, at least a portion of tabs 54, 58 will slide beneath lips 38 prior to tabs 54, 58 fully exiting arcuate channels 42a and 42b (or if used 42c and 42d). Total width, Z, of tabs 54, 58 and respective legs 46, 50, is selected to permit easy movement of tabs 54, 58 and legs 46, 50 through channels 42a, b, c and d. Finally, gripping shoe 18 preferably includes a recess area 56 on the side corresponding to retaining clip 62.

Assembly of gripping shoe 18 to carrier 14 is best visualized with reference to the preferred embodiment of FIGS. 2-8 and 11-12. With carrier 14 installed on injector chain 7, assembly will require movement of gripping shoe 18 within the plane defined by parallel drive chains 7, i.e. parallel drive chains 7 lay within a common plane. Typically, gripping shoe 18 will be placed on carrier 14 when carrier 14 is located on the back portion of chains 7, i.e. the opposite side of chains 7 from the area gripping a length of coiled tubing. Installation will require removal of the guards (not shown) commonly found on injector unit 5. Assembly requires placement of gripping shoe 18 above and subsequently on surface 22 of carrier 14 with legs 46, 50 aligned with arcuate channels 42a and 42b. With gripping shoe 18 positioned on carrier 14 in this manner, gripping shoe 18 will contact the upper surface of clip 62. Application of sufficient pressure to gripping shoe 18 will depress retaining clip 62. Subsequent rotation of gripping shoe 18 moves legs 46, 50 and tabs 54, 58 through channels 42a and 42b until tabs 54, 58 are below lips 38. If clip 62 includes tab 62a, then tab 62a will engage notch or slot 62c of shoe 18 when in the final assembled position.

Although the configuration of gripping shoe 18 and carrier 14 permits rotational movement of gripping shoe 18 on carrier 14 during assembly, the configuration precludes movement of gripping shoe 18 in the lateral direction during and following installation. Thus, installation of gripping shoe 18 to carrier 14 requires movement within the plane of chain assembly 7 and subsequent rotational movement of gripping shoe 18 on carrier 14 to the assembled position as depicted in FIG. 6.

As noted above, manufacturing tolerances for gripping shoe 18 and carrier 14 provide sufficient clearance to permit rotational movement of gripping shoe 18 on carrier 14. While the preferred configuration would permit rotational movement while establishing contact between tabs 54, 58 and lips 38, the typical configuration provides a few thousands of an inch clearance between tabs 54, 58 and lips 38 when gripping shoe 18 is finally positioned on carrier 14.

Thus, in the preferred embodiment, retaining clip 62, tabs 54, 58 and lips 38 cooperate to secure gripping shoe 18 to carrier 14. Following positioning of the tabs 54, 58 beneath lips 38, retaining clip 62 moves to an "up" position adjacent to the recess area 56 on gripping shoe 18, thereby securing gripping shoe 18 in a position suitable for securing coiled tubing between a pair of grippers 10. As shown in FIGS. 5, 7, 8, 10 and 11 retaining clip 62 does not block channels 42a, 42b, 42c or 42d. Further, although preferred, retaining clip 62 may be omitted.

When fully assembled, the coupling mechanism of gripper assembly 10 precludes relative movement of gripping shoe 18 within or perpendicular to the common plane defined by parallel drive chains 7.

Removal of gripping shoe 18 requires depression of retaining clip 62 and rotation of gripping shoe 18 until the tabs 54, 58 clear lips 38. Gripping shoe 18 is lifted off of carrier 14 within the plane defined by parallel drive chains 7 of coiled tubing injector unit 5.

The above discussion of the assembly of gripping shoe 18 to carrier 14 focused on the embodiment of the current invention wherein arcuate channels 42a and 42b provide passage from first side 26 to second side 30. One skilled in the art will readily recognize that the assembly of gripping shoe 18 to carrier 14 having arcuate channels 42a, 42b, 42c and 42d as depicted in FIG. 10 will be carried out in a similar manner. The only difference when using carrier 14 as depicted in FIG. 10 being the limitation on rotational movement.

Figure 8:
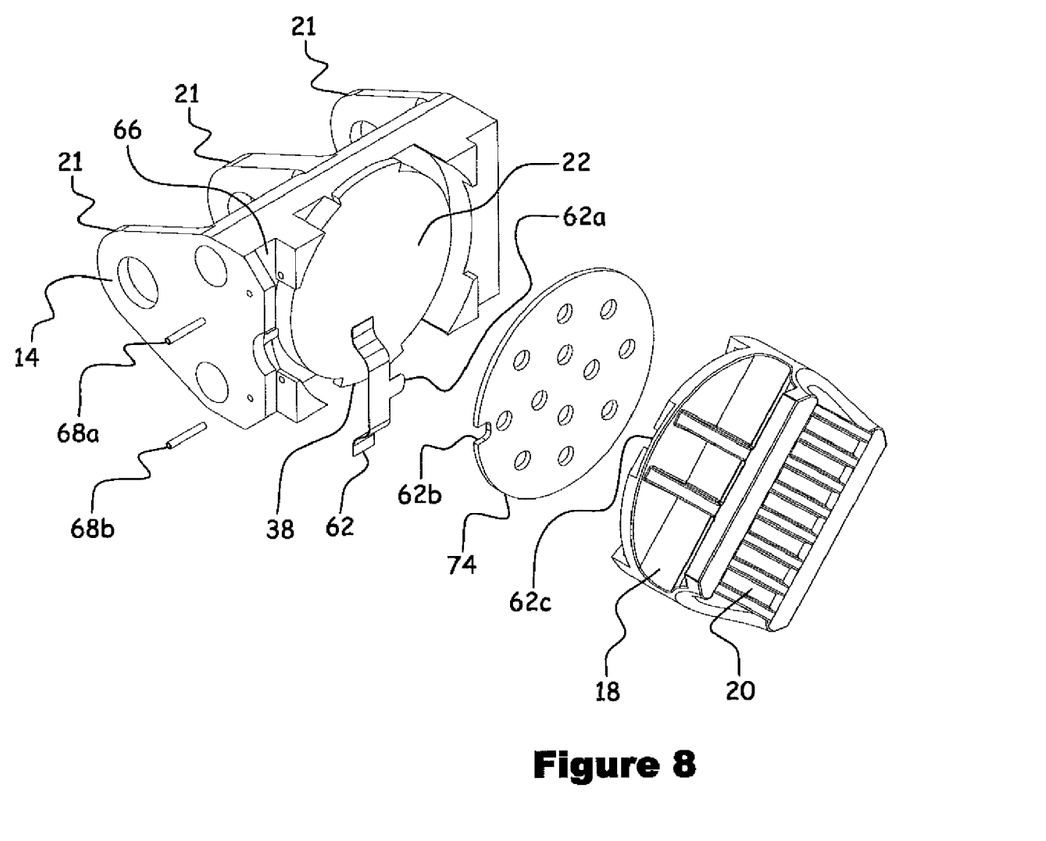
FIG. 8 is an expanded view of an alternative embodiment of the current invention.
Figure 9:
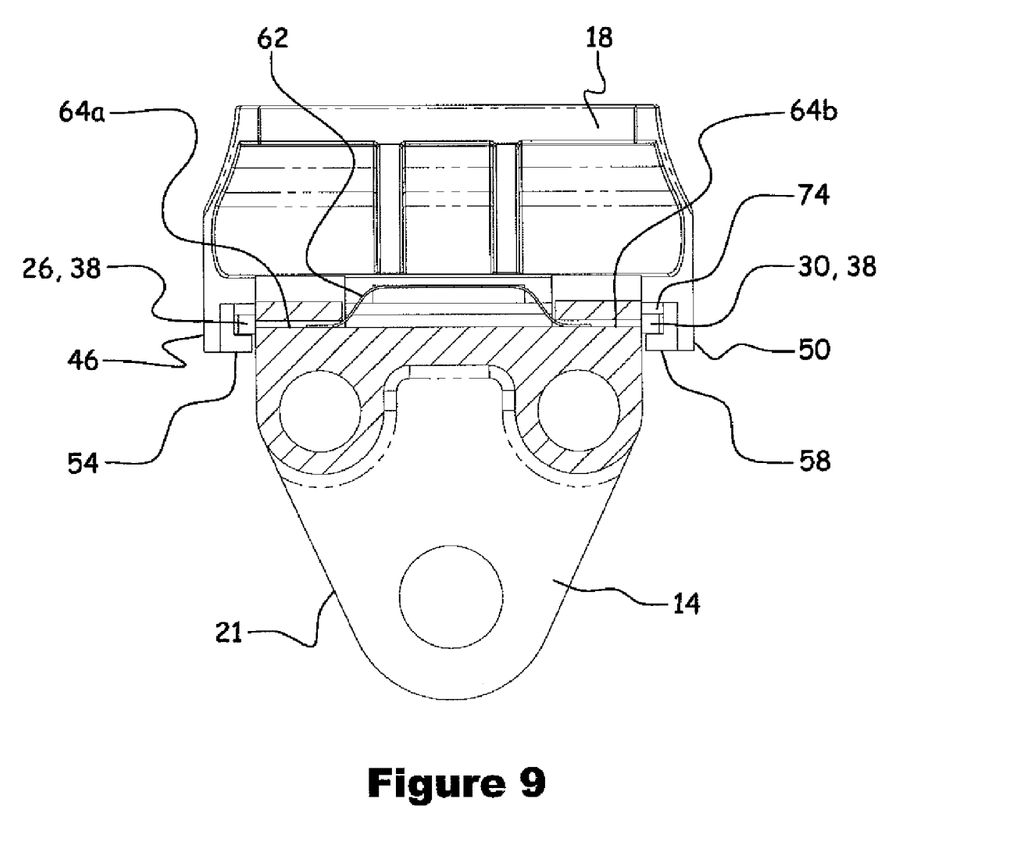
FIG. 9 is a side cutaway view taken along line 9-9 in FIG. 11.

As depicted in FIGS. 5, 7 and 8, the preferred embodiment of gripper 10 includes a pad 74 positioned between carrier 14 and gripping shoe 18. Pad 74 is positioned on surface 22 of carrier 14 prior to assembly. Pad 74 may be any convenient polymeric material such as but not limited to rubber, nylon, polystyrene, polypropylene and other similar thermoplastic or thermosetting polymers. As known to those skilled in the art, the compressive force applied by coiled tubing injector unit 5 to the coiled tubing (not shown) depends upon the tolerances between machined parts within the unit. Each manufacturing tolerance adds to the degree of "play" between parts thereby reducing compressive force applied to coiled tubing manipulated by the injector unit. The compressive nature of pad 74 compensates for necessary tolerance variations between machined parts thereby evenly transferring traction force through gripper assembly 10 to the coiled tubing. Pad 74 also reduces the noise generated by the impact of the gripping shoe 18 contacting carrier 14 during engagement with a coiled tubing string, not shown. When retaining clip 62, includes tab 62a, pad 74 will include slot or notch 62b to permit engagement of tab 62a with slot notch 62c of gripping shoe 18.

Figure 16:
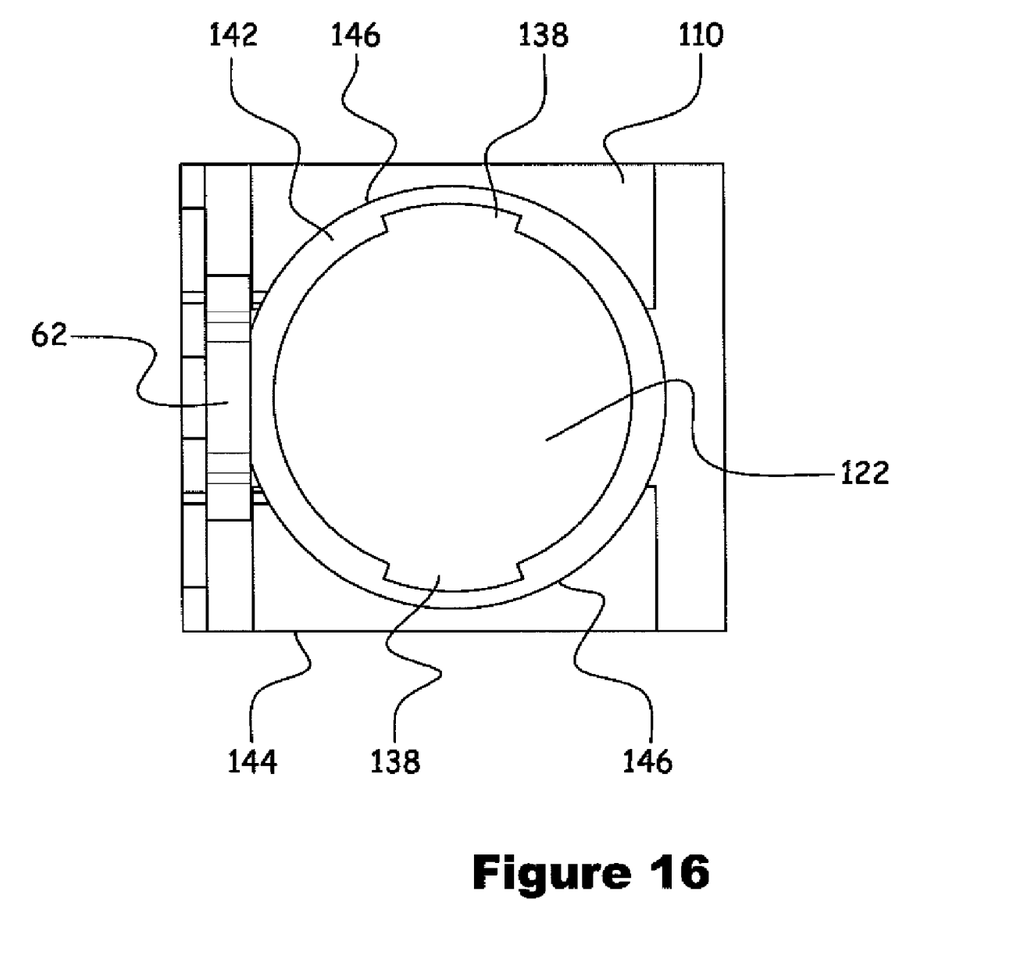
FIG. 16 is a top view of an alternative embodiment of the carrier.
Figure 17:
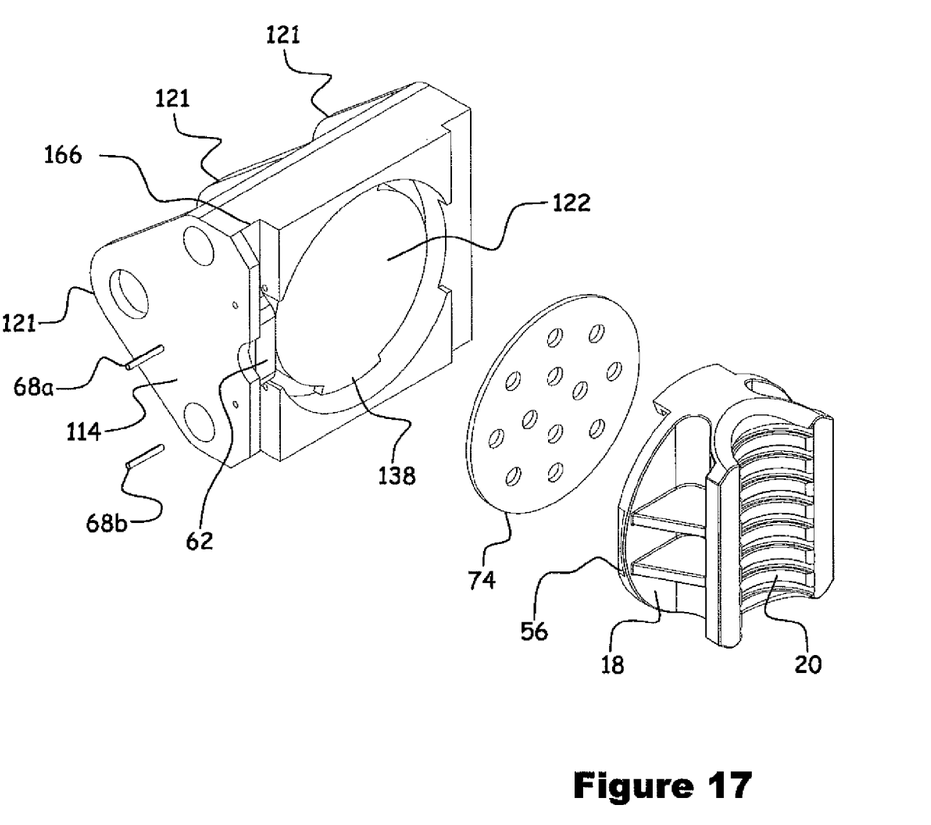
FIG. 17 is a perspective view of an alternative embodiment of FIG. 16.

In an alternative embodiment depicted in FIGS. 16-17, carrier 114 has an upper body 110. Located within upper body 110 is a circular channel 142. Circular channel 142 defines the outer circumference of an upper surface 122. Upper surface 122 includes at least two lips 138 extending outwardly above or into channel 142. Lips 138 extend toward outer edge 144 of carrier 114. The distance between channel wall 146 and lips 138 is sufficient to permit passage of downwardly projecting legs 46, 50 of gripping shoe 18 while tabs 54, 58 pass beneath lips 138. The remaining components of carrier 114, such as, but not limited to, lower surface 121 and channel 166, correspond to the corresponding elements of carrier 14 as described above and shown in FIGS. 4-8. Thus, although only one version of clip 62 is depicted in FIGS. 16 and 17, any version of clip 62 and its associated elements are suitable for use in this embodiment. Further, assembly of gripping shoe 18 to carrier 114 is performed in the same manner as discussed above with regard to carrier 14 including the addition of pad 74. Finally, although FIG. 16 depicts a single circular channel 142, one skilled in the art will recognize that shorter arcuate channels (not shown) similar to that of FIG. 10 may be substituted for single channel 142.

Other embodiments of the current invention will be apparent to those skilled in the art from a consideration of this specification or practice of the invention disclosed herein. Thus, the foregoing specification is considered merely exemplary of the current invention with the true scope and spirit of the invention being defined by the following claims.

We claim:

1. A gripper assembly comprising:
   a carrier, said carrier having an upper surface with at least one arcuate channel;
   a gripping shoe positioned on said carrier, said gripping shoe has at least one downwardly extending leg carrying an inwardly projecting tab and said gripping shoe has an upper surface configured to grip coiled tubing;
   wherein said inwardly projecting tab and downwardly extending leg cooperates with said carrier to preclude lateral movement of said gripping shoe while permitting rotational movement of said gripping shoe on said carrier and wherein in the assembled configuration, said upper surface of said gripping shoe defines the central axis of said gripper assembly.

2. The gripper assembly of claim 1, wherein said carrier further comprises:
   two outwardly extending lips said outwardly extending lips are positioned on the central axis of said gripper assembly;
   said carrier has at least two arcuate channels, each arcuate channel having at least one open end adjacent to at least one of said outwardly projecting lips; and,
   said gripping shoe has at least two downwardly projecting legs, each leg carrying an inwardly projecting tab, wherein said tabs cooperate with said lips to retain said gripping shoe on said carrier.

3. The gripper assembly of claim 1, wherein said carrier further comprises:
   two outwardly extending lips;
   wherein said arcuate channel is a continuous circular channel defining the outer circumference of said upper surface; and,
   said gripping shoe has at least two downwardly projecting legs, each leg carrying an inwardly projecting tab, wherein said tabs cooperate with said lips to retain said gripping shoe on said carrier.

4. The gripper assembly of claim 1, wherein said gripper assembly is incorporated into a coiled tubing injector unit.

5. A gripper assembly comprising:
   a carrier, said carrier having an upper surface with at least two arcuate channels;
   a gripping shoe positioned on said carrier;
   said gripping shoe having two downwardly extending legs, each leg carrying an inwardly projecting tab and said gripping shoe has an upper surface configured to grip coiled tubing;
   wherein said downwardly extending legs and inwardly projecting tabs cooperate with said carrier to preclude lateral movement of said gripping shoe while permitting rotational movement of said gripping shoe on said carrier, wherein in the assembled configuration, said upper surface of said gripping shoe defines the central axis of said gripper;
   wherein in the assembled configuration, said inwardly projecting tabs cooperate with said carrier to retain said gripping shoe on said carrier.

6. The gripper assembly of claim 5, wherein said carrier further comprises two outwardly extending lips and wherein each arcuate channel has at least one open end adjacent to at least one of said outwardly projecting lips.

7. The gripper assembly of claim 6, wherein said outwardly extending lips are positioned on the central axis of said gripper assembly and said inwardly projecting tabs cooperate with said outwardly projecting lips to retain said gripping shoe on said carrier.

8. The gripper assembly of claim 5, wherein said carrier further comprises a retaining clip, said retaining clip positioned to preclude rotational movement of said gripping shoe installed on said on said carrier.

9. The gripper assembly of claim 5, wherein said carrier further comprises a retaining clip said retaining clip carries a tab projecting towards said gripping shoe, said gripping shoe including at least one recess configured to receive said retaining clip, whereby said retaining clip cooperates with said recess to preclude rotational movement of said gripping shoe installed on said carrier.

10. The gripper assembly of claim 5, wherein said carrier has four arcuate channels, and wherein each channel has an open end adjacent to one of said outwardly extending lips.

11. The gripper assembly of claim 5, wherein said gripper assembly is incorporated into a coiled tubing injector unit.

12. A gripper assembly comprising:
a carrier;
said carrier having an upper surface
said carrier having at least two outwardly extending lips;
said upper surface having a circular channel;
a gripping shoe positioned on said carrier;
said gripping shoe having two downwardly extending legs, each leg carrying an inwardly projecting tab and said gripping shoe has a concave upper surface configured to grip coiled tubing;
wherein said inwardly projecting tabs cooperate with said carrier to preclude lateral and vertical movement of said gripping shoe while permitting rotational movement of said gripping shoe on said carrier, wherein in the assembled configuration, said upper surface of said gripping shoe defines the central axis of said gripper assembly and wherein said outwardly projecting lips are positioned on the central axis of said gripper assembly.

13. The gripper assembly of claim 12, wherein said outwardly extending lips and said inwardly projecting tabs cooperate to retain said gripping shoe on said carrier.

14. The gripper assembly of claim 12, wherein said carrier further comprises a retaining clip, said retaining clip positioned to preclude rotational movement of a gripping shoe after said gripping shoe is installed on said on said carrier.

15. The gripper assembly of claim 14, wherein said retaining clip secures said gripping shoe such that said concave upper surface is aligned with the central axis of the gripper assembly.

16. The gripper assembly of claim 12, wherein said carrier further comprises a retaining clip said retaining clip carries a tab projecting towards said gripping shoe, and wherein said gripping shoe further comprises at least one recess configured to receive said retaining clip, whereby said retaining clip cooperates with said recess to preclude rotational movement of said shoe after said gripping shoe is installed on said carrier.

17. The gripper assembly of claim 16, wherein said retaining clip secures said gripping shoe such that said concave upper surface is aligned with the central axis of the gripper assembly.

18. The gripper assembly of claim 12, wherein said gripper assembly is incorporated into a coiled tubing injector unit.

19. A gripper assembly comprising:
a carrier;
said carrier having an upper surface, a first side and a second side, said first side carrying an outwardly extending lip and said second side carrying an outwardly extending lip;
said upper surface having two recessed arcuate channels, wherein each recessed arcuate channel has a first open end terminating at said first side of said carrier and a second open end terminating at said second side of said carrier;
a gripping shoe positioned on said carrier;
said gripping shoe having two downwardly extending legs, each leg carrying an inwardly projecting tab and said gripping shoe has an upper surface configured to grip coiled tubing;
wherein said inwardly projecting tabs cooperate with said carrier to preclude lateral and vertical movement of said gripping shoe while permitting rotational movement of said gripping shoe on said carrier, wherein in the assembled configuration, said upper surface of said gripping shoe defines the central axis of said gripper assembly and wherein said outwardly projecting lips are positioned on the central axis of said gripper assembly; and,
wherein in the assembled configuration, said inwardly projecting tabs cooperate with said carrier to retain said gripping shoe on said carrier.

20. The gripper assembly of claim 19, wherein said inwardly projecting tabs cooperate with said outwardly extending lips to retain said gripping shoe on said carrier.

21. The gripper assembly of claim 20 wherein said carrier further comprises a retaining clip, said retaining clip positioned to preclude rotational movement of a gripping shoe after said gripping shoe is installed on said carrier.

22. The gripper assembly of claim 20, wherein said carrier further comprises a retaining clip said retaining clip carries a tab projecting towards said gripping shoe, and wherein said gripping shoe further comprises at least one recess configured to receive said retaining clip, whereby said retaining clip cooperates with said recess to preclude rotational movement of said shoe after said gripping shoe is installed on said carrier.

23. The gripper assembly of claim 19, wherein said inwardly projecting tabs have a length greater than the distance from said open ends to said outwardly extending lips.

24. The gripper assembly of claim 19, wherein each arcuate channel has at least one open end adjacent to at least one of said outwardly projecting lips.

25. The gripper assembly of claim 19, wherein said gripper assembly is incorporated into a coiled tubing injector unit.

* * * * *